US012563624B2

(12) United States Patent
Sheikh et al.

(10) Patent No.: US 12,563,624 B2
(45) Date of Patent: Feb. 24, 2026

(54) METHOD TO GET A UE INTO SERVICE ON PRIORITIZED RAT AFTER OUT OF SERVICE DETECTION

(71) Applicant: Apple Inc., Cupertino, CA (US)

(72) Inventors: Parvez Sheikh, Bengaluru (IN); Prasad P. Ashtekar, Bavaria-Bayern (DE); Bernd H. Kemmer, Eichenau (DE)

(73) Assignee: Apple Inc., Cupertino, CA (US)

( * ) Notice: Subject to any disclaimer, the term of this patent is extended or adjusted under 35 U.S.C. 154(b) by 602 days.

(21) Appl. No.: 17/950,480

(22) Filed: Sep. 22, 2022

(65) Prior Publication Data

US 2023/0092882 A1     Mar. 23, 2023

(30) Foreign Application Priority Data

Sep. 22, 2021    (IN) .............................. 202141042857

(51) Int. Cl.
*H04W 76/19*         (2018.01)
*H04W 48/18*         (2009.01)

(52) U.S. Cl.
CPC ........... *H04W 76/19* (2018.02); *H04W 48/18* (2013.01)

(58) Field of Classification Search
CPC ..... H04W 76/19; H04W 48/18; H04W 48/16; H04W 48/20
USPC ....................................................... 370/329
See application file for complete search history.

(56) References Cited

U.S. PATENT DOCUMENTS

| | | | |
|---|---|---|---|
| 9,973,902 B2 | 5/2018 | Jung et al. | |
| 2018/0084487 A1 | 3/2018 | Arumugam et al. | |
| 2020/0322856 A1* | 10/2020 | Wang ................... | H04W 36/04 |

FOREIGN PATENT DOCUMENTS

| | | |
|---|---|---|
| CN | 101529955 A | 9/2009 |
| CN | 106714134 A | 5/2017 |
| CN | 106792624 A | 5/2017 |
| KR | 20150117658 A | 10/2015 |
| WO | 2008052123 A1 | 5/2008 |

OTHER PUBLICATIONS

First Examination Report directed to related Indian Patent Application No. 202141042857, mailed Aug. 29, 2023; 5 pages.

(Continued)

*Primary Examiner* — Huy C Ho
(74) *Attorney, Agent, or Firm* — Sterne, Kessler, Goldstein & Fox P.L.L.C.

(57) ABSTRACT

Techniques are provided for implementing a cell selection procedure to get a user equipment (UE) into service on prioritized RAT after an out-of-service detection. For example, some aspects of this disclosure relate to a method including determining, by a user equipment (UE), whether the UE has a loss of service, and in response to determining that the UE has the loss of service, initiating an initial cell selection (ICS) and starting a timer. The method further includes determining whether a suitable cell is identified during the ICS and determining whether the timer has expired. The method further includes, in response to determining that a suitable cell is not identified during the ICS and the timer has expired, pausing the ICS, and performing an intermediate stored information cell selection (ISICS) to identify a suitable cell.

14 Claims, 10 Drawing Sheets

(56)  References Cited

OTHER PUBLICATIONS

3GPP TS 36.304 V16.5.0 (Sep. 2021), 3rd Generation Partnership Project; Technical Specification Group Radio Access Network; Evolved Universal Terrestrial Radio Access (E-UTRA); User Equipment (UE) procedures in idle mode (Release 16); 64 pages.
3GPP TS 38.304 V16.6.0 (Sep. 2021), 3rd Generation Partnership Project; Technical Specification Group Radio Access Network; NR; User Equipment (UE) procedures in Idle mode and RRC Inactive state (Release 16); 39 pages.

* cited by examiner

100

107

105

103

UE

109

105

101

111

<u>900</u>

METHOD TO GET A UE INTO SERVICE ON PRIORITIZED RAT AFTER OUT OF SERVICE DETECTION

CROSS-REFERENCE TO RELATED APPLICATIONS

This application claims priority to Indian Application No. 202141042857, entitled "METHOD TO GET A UE INTO SERVICE ON A PRIORITIZED RAT AFTER OUT-OF-SERVICE DETECTION", filed Sep. 22, 2021, the entire contents of which are hereby incorporated by reference herein in its entirety.

BACKGROUND

Field

The described aspects generally relate to mechanisms for cell selection in wireless communications.

Related Art

After an out-of-service detection, a user equipment (UE) performs a cell selection procedure to find service on a suitable cell. In some examples, the UE first attempts to find a suitable cell to camp on by performing a search on a stored list of carrier frequencies. In some examples, the UE attempts to find a suitable cell by performing a search on all carrier frequencies corresponding to each RAT it supports.

SUMMARY

Some aspects of this disclosure relate to apparatuses and methods to get a UE into service on a prioritized radio access technology (RAT) after an out-of-service detection. For example, some aspects of this disclosure relate to apparatuses and methods for performing cell selection over a list of frequencies corresponding to a plurality of priority RATs after the UE loses service.

Some aspects of this disclosure relate to a UE that has a transceiver configured to enable wireless communication with a current serving cell and one or more potential serving cells, and a processor communicatively coupled to the transceiver. The processor is configured to determine whether the UE has a loss of service, and in response to determining that the UE has the loss of service, perform a stored information cell selection (SICS). The processor is further configured to determine whether a suitable cell is identified during the SICS, and in response to determining that a suitable cell is not identified during the SICS, initiate an initial cell selection (ICS) and start a timer. The processor is further configured to determine whether a suitable cell is identified during the ICS and determine whether the timer has expired. In response to determining that a suitable cell is not identified during the ICS and the timer has expired, the processor is configured to pause the ICS, and perform an intermediate stored information cell selection (ISICS) to identify a suitable cell.

The processor can be further configured to determine whether a suitable cell is identified during the ISICS, and in response to a determination that a suitable cell is not identified during the ISICS, it resumes the ICS and starts a second timer. The SICS comprises performing a search on a stored list of frequencies that are associated with one or more previously-used suitable cells. According to some aspects, an ICS comprises performing a search on a plurality of frequencies corresponding to a plurality of RATs. According to some aspects, an ISICS comprises performing a search on a stored list of frequencies corresponding to a plurality of priority RATs. According to some aspects, the ISICS comprises performing a search on a plurality of frequencies corresponding to a last connected RAT corresponding to a last registered public land mobile network (PLMN).

Some aspects of this disclosure relate to a method that includes determining whether the UE has a loss of service and, in response to determining that the UE has the loss of service, performing a stored information cell selection (SICS). The method further includes determining whether a suitable cell is identified during the SICS, and in response to determining that a suitable cell is not identified during the SICS, initiating an initial cell selection (ICS) and starting a timer. The method further includes determining whether a suitable cell is identified during the ICS and determining whether the timer has expired. In response to determining that a suitable cell is not identified during the ICS, and in response to determining that the timer has expired, the method further includes pausing the ICS and performing an intermediate stored information cell selection (ISICS) to identify a suitable cell.

The method can further include determining whether a suitable cell is identified during the ISICS and in response to a determination that a suitable cell is not identified during the ISCIS, resuming the ICS, and starting a second timer. According to some aspects, a SICS comprises performing a search on a stored list of frequencies that are associated with one or more previously-used suitable cells. According to some aspects, an ICS comprises performing a search on a plurality of frequencies corresponding to a plurality of RATs. According to some aspects, an ISICS comprises performing a search on a stored list of frequencies corresponding to a plurality of priority RATs.

Some aspects of this disclosure relate to a non-transitory computer-readable medium storing instruction that, when executed by a processor of a UE, cause the processor to perform operations including determining whether the UE has a loss of service, and in response to determining that the UE has the loss of service, performing a stored information cell selection (SICS). The operations further include determining whether a suitable cell is identified during the SICS, and in response to determining that a suitable cell is not identified during the SIC S, initiating an initial cell selection (ICS) and starting a timer. The operations further include determining whether a suitable cell is identified during the ICS, and determining whether the timer has expired, and in response to determining that a suitable cell is not identified during the ICS, and determining that the timer has expired, pausing the ICS, and performing an intermediate stored information cell selection (ISICS) to identify a suitable cell. According to some aspects, a SICS comprises performing a search on a stored list of frequencies that are associated with one or more previously-used suitable cells. According to some aspects, an ICS comprises performing a search on a plurality of frequencies corresponding to a plurality of RATs. According to some aspects, an ISICS comprises performing a search on a stored list of frequencies corresponding to a plurality of priority RATs.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
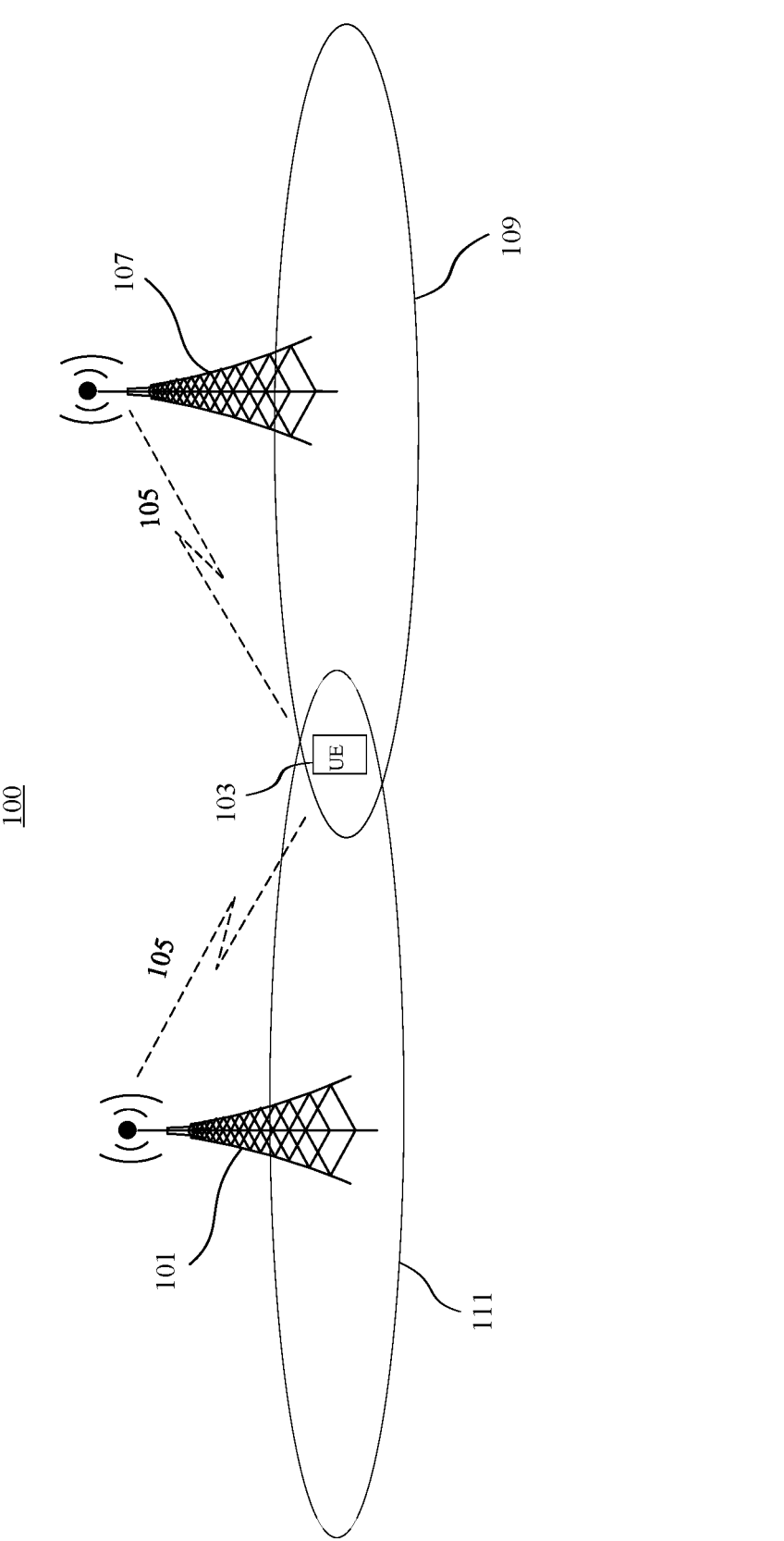
FIG. 1 illustrates an example system implementing a cell selection procedure to get a UE into service on prioritized RAT after an out-of-service detection, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure relate to apparatuses and methods to get a user equipment (UE) into service on a prioritized RAT after out-of-service detection. For example, some aspects of this disclosure relate to apparatuses and methods for performing cell selection after a UE loses service. According to some aspects, the UE performs a cell selection search on prioritized RATs.

In some examples, the aspects of this disclosure can be performed by a network and/or a UE that operates according to Release 17 (Rel-17) and/or Rel-17 new radio (NR) of 5th generation (5G) wireless technology for digital cellular networks as defined by 3rd Generation Partnership Project (3GPP). Additionally, or alternatively, the aspects of this disclosure can be performed by a network and/or a UE that operates according to the Release 15 (Rel-15), Release 16 (Rel-16), or others. However, the aspects of this disclosure are not limited to these examples, and one or more mechanisms of this disclosure can be implemented by other network(s) and/or UE(s) for cell selection procedure to get a UE into service on prioritized RAT.

FIG. 1 illustrates an example system 100 implementing cell selection procedure, according to some aspects of the disclosure. Example system 100 is provided for the purpose of illustration only and does not limit the disclosed aspects.

System 100 may include, but is not limited to, base stations 101 and 107 and user equipment 103. User equipment 103 can be configured to operate based on a wide variety of wireless communication techniques. These techniques can include, but are not limited to, techniques based on 3rd Generation Partnership Project (3GPP) standards. For example, UE 103 can be configured to operate using Rel-17 or others. UE 103 can include, but is not limited to, wireless communication devices, smart phones, laptops, desktops, tablets, personal assistants, monitors, televisions, wearable devices, Internet of Things (IoTs), vehicle's communication devices, and the like. Base stations 101 and 107 can include one or more nodes configured to operate based on a wide variety of wireless communication techniques such as, but not limited to, techniques based on 3GPP standards. For example, base stations 101 and 107 can include one or more nodes configured to operate using Rel-17 or others. Further, base station 101 is associated with and provides service for cell 111. Likewise, base station 107 is associated with and provides service for cell 109. In some aspects, even though both of cells 111 and 109 are available to provide wireless service to UE 103, cell 111 can be prioritized over cell 109 for various performance reasoning (e.g. differing available RATs), as will be understood by those skilled in the art.

According to some aspects, UE 103 can lose service with a current serving cell 111 with base station 101. To get into service, UE 103 seeks to associate with a suitable cell by scanning all supported radio frequency bands to find a suitable cell from a number of potential cells, such as cell 109.

According to some aspects, base stations 101 and 107 periodically broadcast a series of system information that is required for initial access at regular intervals. The UE 103 can use the broadcasted system information for initial access and initial connection to base station 101 or base station 107. The initial access can be performed using carrier signal 105, which can include one or more component carriers (CC). In other words, UE 105 can implement carrier aggregation (CA) using multiple carriers for communication with base station 101.

According to some aspects, base station 107 implements NR radio access technology and transmits minimum system information (MSI) periodically. The broadcasted MSI comprises a master information block (MIB) and a system information block 1 (SIB1). MIB includes a limited number of the most frequently transmitted parameters, which are essential for initial access to the network. SIB includes parameters needed to determine if a cell is suitable for cell selection and information about the time domain scheduling of other system information blocks.

According to some aspects, UE 103 performs an intra-frequency search to scan for cells that use different scrambling codes for the same frequency. According to some aspects, UE 103 performs an inter-frequency search to scan for cells that use different frequencies. According to some aspects, UE 103 performs an inter-RAT search to find cells that use different radio access technologies (RATs). Various RATs can include NR, E-UTRAN, UTRAN TDD, UTRAN FDD, CDMA2000, and GSM/EDGE.

According to some aspects, UE 103 performs an initial cell selection (ICS) procedure or a stored information cell selection (SICS) procedure, for example, as described in 3GPP Technical Specification (TS) 38.304 Section 5.2.3.

During the ICS procedure, UE 103 scans all RF frequencies corresponding to each RAT it supports. During the SICS procedure, UE 103 uses stored measurement information of carrier frequencies from previous carrier measurements and optionally also information on cell parameters, from previously received measurement control information elements or from previously detected cells. Once the UE finds a suitable cell, it selects the cell and camps on it.

According to some aspects, UE 103 searches for the strongest cell on each carrier frequency, where the strongest cell on each carrier frequency can be determined based on one or more signal strength metrics or signal quality metrics obtained by UE 103. According to some aspects, signal strength metrics include received signal strength indicator (RSSI), received signal code power (RSCP), and reference signal received power (RSRP). According to some aspects, signal quality metrics include signal to interference plus noise ratio (SINR) and reference signal received quality (RSRQ).

Figure 2:
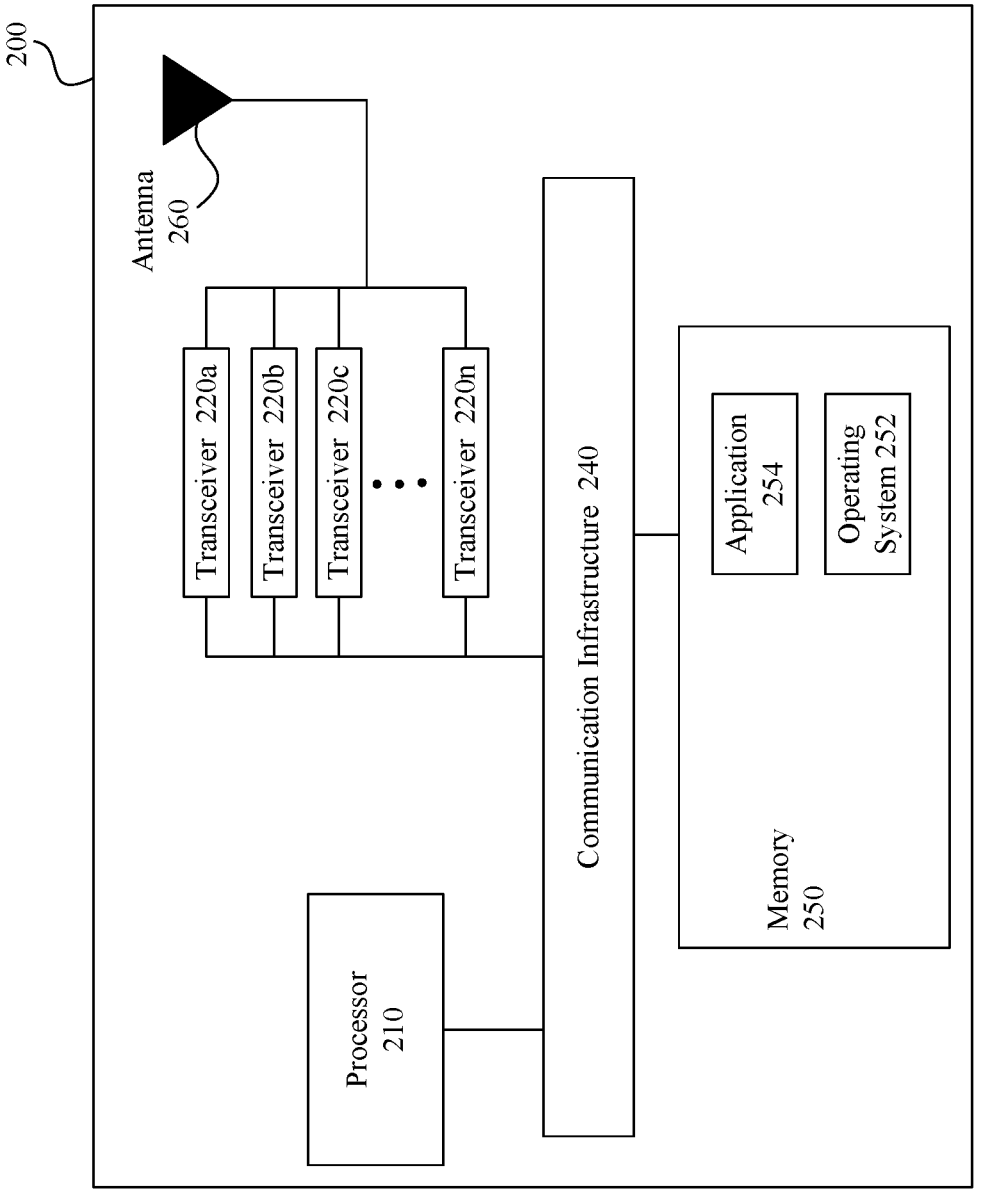
FIG. 2 illustrates a block diagram of an example system of an electronic device implementing a cell selection procedure to get a UE into service on prioritized RAT, according to some aspects of the disclosure.

FIG. 2 illustrates a block diagram of an example system 200 of an electronic device implementing cell selection procedure to get a UE into service on a prioritized RAT after out-of-service detection, according to some aspects of the disclosure. System 200 may be any of the base stations 101 or 107, and/or UE 103 of system 100. System 200 includes processor 210, one or more transceivers 220a-220n, communication infrastructure 240, memory 250, operating system 252, application 254, and antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220a-220n. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, radio streaming, video streaming, remote control, and/or other user applications.

System 200 can also include communication infrastructure 240. Communication infrastructure 240 provides communication between, for example, processor 210, one or more transceivers 220a-220n, and memory 250. In some implementations, communication infrastructure 240 may be a bus. Processor 210 together with instructions stored in memory 250 performs operations enabling system 200 of system 100 to implement cell selection procedure to get a UE into service on a prioritized RAT after out-of-service detection, as described herein.

One or more transceivers 220a-220n transmit and receive communications signals that support getting UE 103 into service on a prioritized RAT after out-of-service detection, according to some aspects, and may be coupled to antenna 260. Antenna 260 may include one or more antennas that may be the same or different types. One or more transceivers 220a-220n allow system 200 to communicate with other devices that may be wired and/or wireless. In some examples, one or more transceivers 220a-220n can include processors, controllers, radios, sockets, plugs, amplifiers, filters, buffers, and like circuits/devices used for connecting to and communication on networks. According to some examples, one or more transceivers 220a-220n include one or more circuits to connect to and communicate on wired and/or wireless networks.

According to some aspects, one or more transceivers 220a-220n can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220a-220n can include more or fewer systems for communicating with other devices.

In some examples, one or more transceivers 220a-220n can include one or more circuits (including a WLAN transceiver) to enable connection(s) and communication over WLAN networks such as, but not limited to, networks based on standards described in IEEE 802.11. Additionally, or alternatively, one or more transceivers 220a-220n can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220n can include a Bluetooth™ transceiver.

Additionally, one or more transceivers 220a-220n can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220a-220n can be configured to operate according to one or more of Rel-15, Rel-16, Rel-17, or other of the 3GPP standards.

According to some aspects, processor 210, alone or in combination with computer instructions stored within memory 250, and/or one or more transceiver 220a-220n, implements cell selection procedure to get a UE into service on a prioritized RAT after out-of-service detection, as discussed herein.

Figure 3:
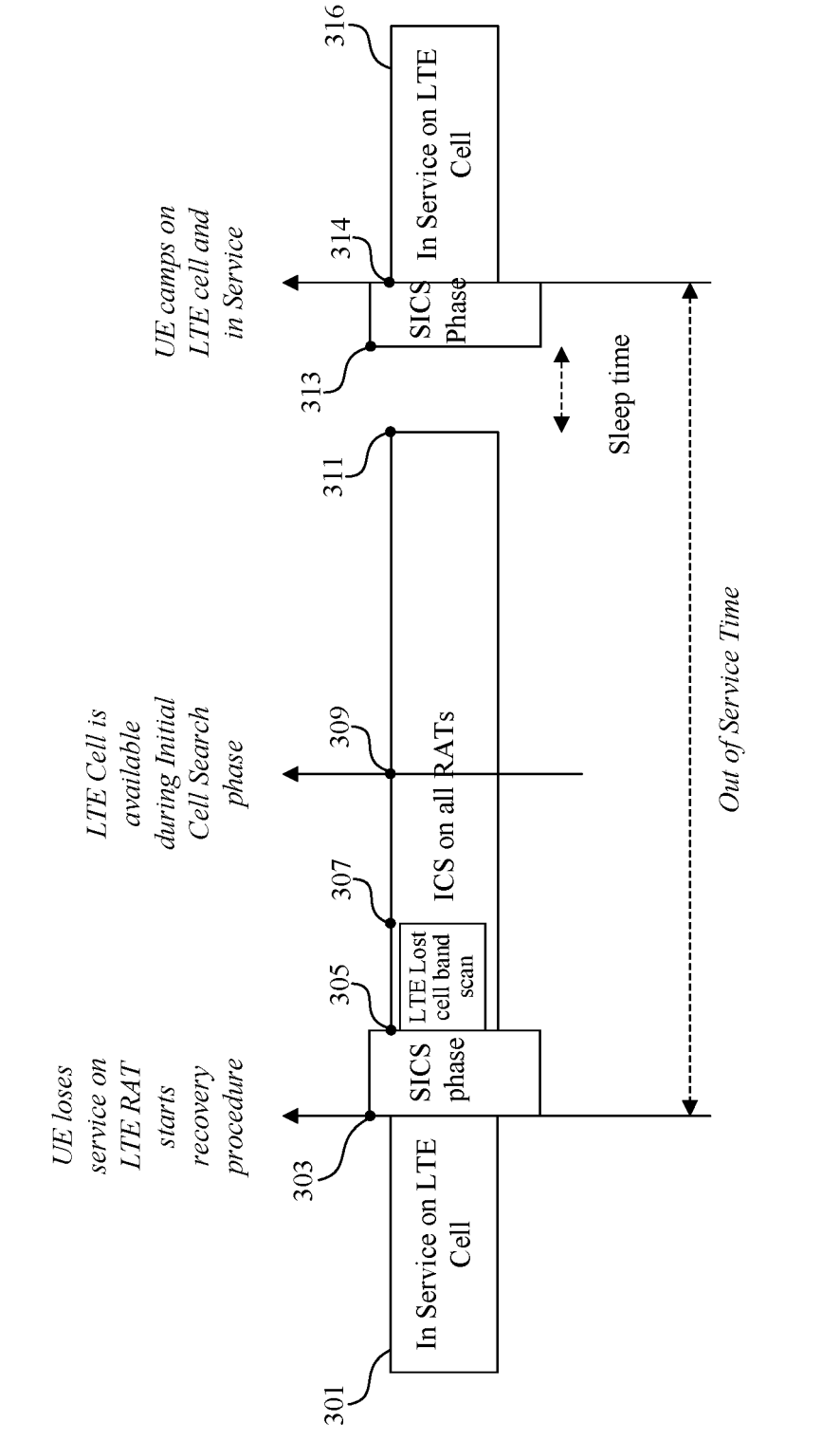
FIG. 3 illustrates an exemplary cell selection process after UE loses service, according to some aspects of this disclosure.

FIG. 3 illustrates an exemplary service recovery procedure when UE 103 loses service, according to some aspects of this disclosure. In this example, at 301, UE 103 is in service on an LTE cell and connected to an LTE network. Subsequently, at 303, UE 103 temporarily loses service from the current serving LTE cell 111. According to some aspects, UE 103 loses service from the serving cell, when the LTE cell signal quality received by UE falls below that required for cell suitability. For example, UE temporarily loses service from a serving cell when the UE enters an elevator or passes through a tunnel, thereby blocking or attenuating radio signals.

According to some aspects, when the UE loses service, the UE can enter an idle state and does not belong to a specific cell. As specified in 3GPP TS 38.304, UE idle mode procedures include public land mobile network (PLMN) selection, cell selection and reselection, and location registration.

According to some aspects, the non-access stratum (NAS) of UE 103 can select a PLMN. After selecting a PLMN, UE 103 can select a cell in the selected PLMN to camp on. At 301, when UE 103 loses coverage of the registered PLMN, either a new PLMN is automatically selected in an automatic mode, or an indication of available PLMNs is given to a user of UE 103 so that a manual selection can be performed in a manual mode.

According to some aspects, once UE 103 has selected a PLMN, the NAS can perform the cell selection procedure in order to select a suitable cell of that PLMN and camp on it. the UE 103 can perform cell selection by searching on all supported carrier frequencies of each supported RAT until it finds a suitable cell. According to some aspects, the NAS controls the RATs in which UE 103 performs cell selection. The NAS indicates RATs associated with the selected PLMN and maintains a list of forbidden registration areas and a list of equivalent PLMNs.

According to some aspects, UE 103 can select a suitable cell based on RRC_IDLE or RRC INACTIVE state measurements and cell selection criteria. Conditions that can be fulfilled to consider a cell as a suitable cell are specified in 3GPP TS 38.304, Section 4.5, where a suitable cell if is either part of the selected PLMN, the registered PLMN, or PLMN of the Equivalent PLMN list. According to some aspects, a suitable cell is not part of a tracking area that is in the list of forbidden tracking areas for roaming, and does not have a barred status.

According to some aspects, a suitable cell fulfills the cell selection criteria, for example, as specified in 3GPP TS 38.304, Section 5.2.3.2. or as specified in 3GPP TS 36.304 Section 5.2.3.2. According to some aspects, a cell selection criteria S is fulfilled when the cell selection receive level and the quality level are above a given value: Srxlev>0 and Squal>0, where Srxlev is a cell selection receive level and Squal is a cell selection quality level in decibels According to some aspects, if UE 103 does not find a suitable cell on any frequency or RAT, UE 103 can attempt to find an acceptable cell. An acceptable cell is a cell on which UE may camp to obtain limited service that is less than that provided by a suitable cell. According to some aspects, an acceptable cell fulfills cell selection criteria and does not have a barred status.

According to some aspects, UE 103 can select a PLMN that is associated with a plurality of RATs. At 303, UE 103 may initiate a stored information cell selection procedure. According to some aspects, executing SICS procedure utilizes stored information of carrier frequencies previously used and optionally information on cell parameters from previously received measurement control information elements or from previously detected cells. During the SICS procedure, UE 103 can search on a stored list of frequencies that are associated with one or more previously-used suitable cells.

At 305, UE 103 completes the SICS procedure. If UE 103 finds a suitable cell during the SICS procedure, it selects the cell to camp on. If UE 103 does not find a suitable cell during the SICS procedure, it can initiate an initial cell selection (ICS) procedure. According to some aspects, during the ICS procedure, UE 103 can scan all RF frequencies in the carrier bands according to its capabilities to find a suitable cell. The UE 103 can scan each carrier frequency to identify the strongest cell transmitting on that carrier frequency.

At 305, assuming no suitable cell is found via the SICS procedure, UE 103 begins the initial cell search procedure. In this example, UE 103 starts ICS by scanning RF frequencies corresponding to the LTE RAT associated with the previous serving cell. AT 307, UE 103 completes scanning RF frequencies corresponding to LTE RAT. However, at 307, UE 103 is still out-of-service with respect to last serving LTE cell 111. Further, in this example, UE 103 does not find a suitable cell on the LTE RAT and subsequently proceeds to scan RF frequencies on other RATs in the previously serving PLMN.

At 309, the last serving LTE cell 111, which was the most recent cell on which UE 103 has previously camped, becomes available again to UE 103. However, UE 103 fails to get back in service on the now-available LTE cell 111 because it is engaged in performing initial cell search procedure on the non-LTE RATs. In this example, UE 103 scans through all RF frequencies corresponding to each supported RAT. At 311, UE 103 completes the ICS procedure without finding a suitable cell.

According to some aspects, a cell selection search cycle may comprise one round of SICS procedure and one round of initial cell search procedure followed by a sleep phase of a predefined duration. After completing a search cycle, UE 103 may enter a sleep state for a predefined amount of time. After a predefined sleep duration, UE 103 can exit the sleep state and initiate the next search cycle.

At 313, UE 103 exits the sleep state and starts a new search cycle by initiating a SICS procedure. During the SICS procedure, UE 103 uses a stored list of frequencies, including the frequency band corresponding to cell 111. In this example, since LTE cell 111 is now available, UE 103 selects cell 111 and gets back into service. In the example illustrated in FIG. 3, UE remains out-of-service until the start of a new search cycle, even when the previously camped-on cell becomes available to connect to and get back into service. Further, since UE 103 supports a plurality of RATs, each search cycle involves scanning through a large number of frequencies. As a result, the out-of-service time experienced by UE 103 is substantially prolonged.

Figure 4:
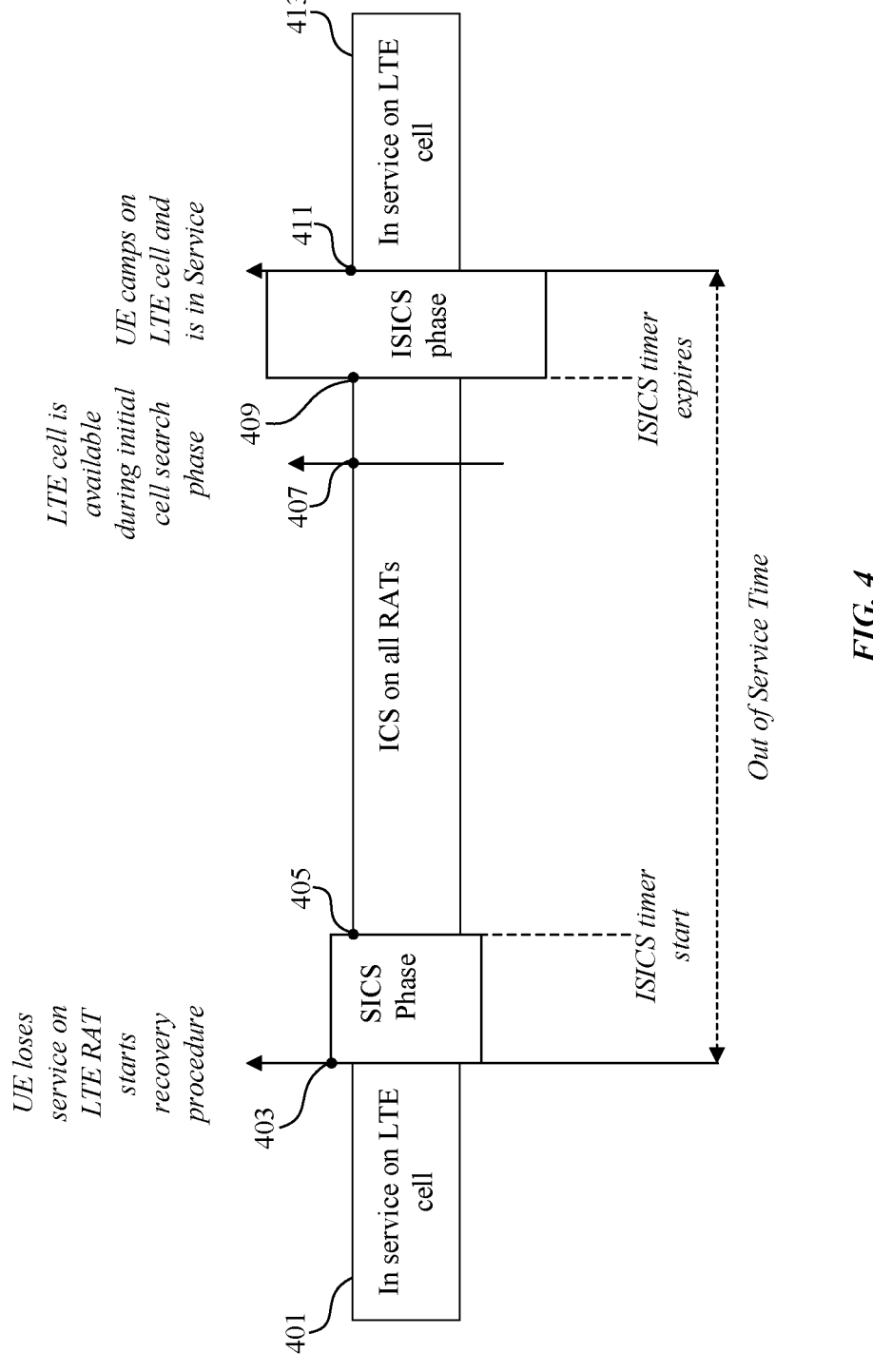
FIG. 4 illustrates an exemplary service recovery process using cell selection with intermediate stored information cell selection (ISICS), according to some aspects of this disclosure.

FIG. 4 illustrates an exemplary service recovery procedure with an intermediate stored information cell selection (SICS) feature, according to some aspects of this disclosure. According to some aspects, after UE loses service with a currently serving cell, performing cell selection procedure using an intermediate stored information cell selection (ISICS) to identify a suitable cell can reduce the out-of-service time for the UE. According to some aspects, the ISICS procedure can enable the UE to get into service on prioritized RAT after an out-of-service detection.

In this example, at 401, UE 103 is in service on an LTE cell connected to an LTE network. Subsequently, at 403, UE detects a loss of service with the current serving cell. According to some aspects, UE can lose service with a current serving cell when the signal quality received by the UE falls below a certain threshold.

According to some aspects, in response to detecting a loss of service, UE initiates a cell selection procedure. At 403, UE performs the SICS procedure to identify a suitable cell. According to some aspects, during the SICS procedure, UE can scan a stored list of previously used carrier frequencies.

Additionally, during SICS, the UE can optionally use the information on cell parameters from previously received measurement control information on cell parameters from previously detected cells.

According to some aspects, if UE 103 fails to find a suitable cell during the SICS procedure, it can initiate the initial cell search (ICS) procedure and start an intermediate stored information cell selection (ISICS) timer. During the ICS procedure, the UE can scan all carrier frequencies in each RAT it supports. The UE can scan each carrier frequency to identify the strongest cell transmitting over that carrier frequency.

At 405, in response to a determination that a suitable cell is not identified during the SICS procedure, UE 103 initiates the ICS procedure and starts an intermediate stored information cell selection (ISICS) timer. At 407, the previous serving cell becomes available to the UE. As non-limiting examples, a previous serving cell becomes available to the UE after temporarily losing service, when the UE exits a tunnel after passing through the tunnel or when the UE exits an elevator, or when the UE clears some other signal blocking obstruction. In this example, at 407, the UE fails to get back into service on the LTE cell because the UE has completed scanning the LTE band as part of the ICS procedure well before the LTE cell becomes available at 407. Hence, in this example, the UE fails to get back in service even when the previously camped on-cell becomes available.

According to some aspects, when the ISICS timer expires, UE 103 can pause the ongoing ICS procedure and initiates an ISICS procedure.

According to some aspects, UE 103 may maintain a list of priority RATs, by storing the priority RATs and their corresponding frequencies in a memory, such as memory 250. During the intermediate SICS procedure, UE 103 scans all RF frequencies corresponding to each priority RAT. According to some aspects, the list of priority RATs can comprise the RAT corresponding to the most recent cell on which UE 103 has previously camped. According to some aspects, the list of priority RATs can comprise the last registered RAT.

According to some aspects, UE 103 can scan RF frequencies corresponding to the priority RATs in an order based on a predefined priority. According to some aspects, an NR RAT can be a higher priority RAT than LTE. According to some aspects, a LTE RAT can be a higher priority RAT than a UMTS RAT. According to some aspects, a UMTS RAT can be a higher priority RAT than a GSM RAT. According to some aspects, the last registered RAT can be a higher priority RAT than LTE.

At 409, in response to the expiration of the ISICS timer, UE performs an ISICS procedure. As a non-limiting example, the list of prioritized RATs includes LTE RAT corresponding to the most recent cell on which UE 103 has previously camped. As a non-limiting example, during the ISICS procedure, the UE scans frequencies corresponding to LTE RAT. In this example, UE identifies the previously serving cell, which is now available, as a suitable cell, selects the suitable cell, and camps on it to get back in service.

According to some aspects, the ISICS timer duration is configurable and can be set to be less than the time that UE 103 can take to complete the initial cell selection search. In other words, referring to FIG. 4, 409 occurs prior to the end ICS that starts at 405. According to some aspects, the intermediate SICS timer duration can be less than the time that UE 103 can take to complete scanning frequencies corresponding to the NR band. According to some aspects, the intermediate SICS timer duration can be less than the time that UE 103 can take to complete scanning frequencies corresponding to LTE or UMTS band. According to some aspects, the ISICS timer duration can depend on the number of RATs supported by the UE.

At 411, the UE camps-on the previously serving LTE cell and gets back into service. In this example, since the timer duration is less than the duration the UE takes to complete ICS, the UE gets back into service before completing an entire ICS search cycle. Accordingly, in this example, due to the ISICS procedure, the UE experiences a reduced out-of-service time.

Figure 5:
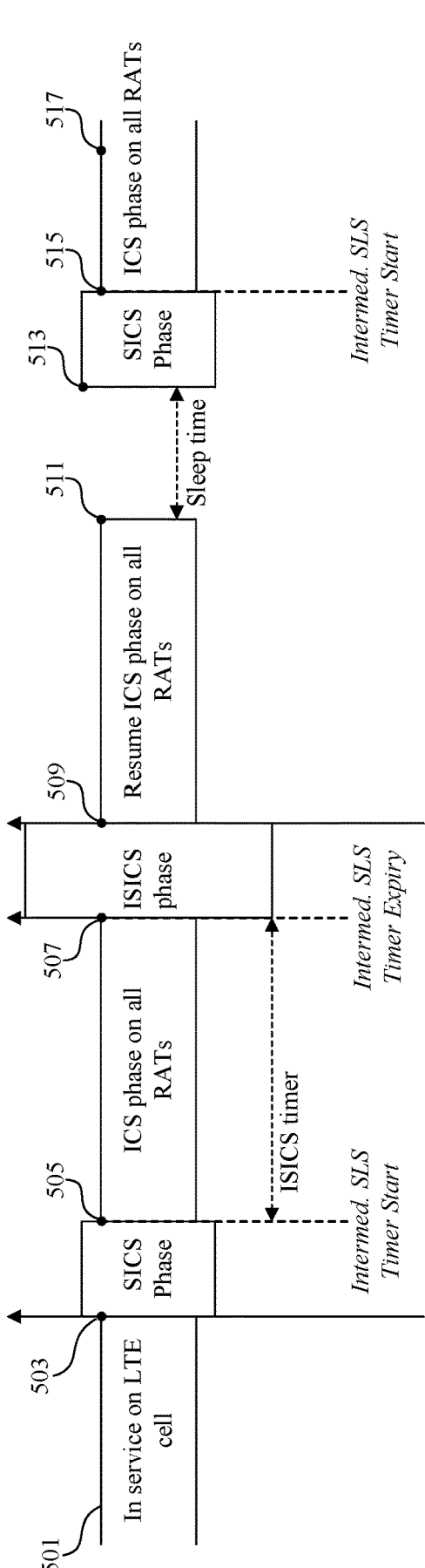
FIG. 5 illustrates an exemplary ISICS during initial cell selection process, according to some aspects of this disclosure.

FIG. 5 illustrates an exemplary ISICS phase during the initial cell selection procedure, according to some aspects of this disclosure. In this example, the UE fails to find a suitable cell to camp on even after completing a search cycle with ISICS. According to some aspects, if the UE fails to identify a suitable cell during an ISCIS procedure, it can resume the paused ICS procedure. According to some aspects, UE resumes the ICS procedure and continues scanning frequencies corresponding to the RATs it supports. According to some aspects, UE can resume the ICS procedure and start another ISICS timer.

In this example, at 501, UE 103 is in service on an LTE cell connected to an LTE network. At 503, UE loses service and performs a SICS procedure to identify a suitable cell. At 505, in response to a determination that a suitable cell is not found during the SICS procedure, UE initiates an ICS procedure and starts an ISICS timer. At 507, based on the expiration of the ISICS timer, the UE pauses the ICS procedure and performs an ISICS procedure. At 509, based on a determination that a suitable cell is not identified during the ISICS procedure, the UE resumes the paused ICS and starts a second ISICS timer. Subsequently, at 511, the UE completes the ICS process. At 511, based on a determination that a suitable cell is not identified after completing a search cycle, the UE enters a sleep mode for a predefined duration. At 513, the UE initiates another round of SICS procedures to find a suitable cell. At 515, based on a determination that a suitable cell is not identified during the SICS procedure, the UE starts another round of ICS procedure and starts an ISICS timer.

Figure 6:
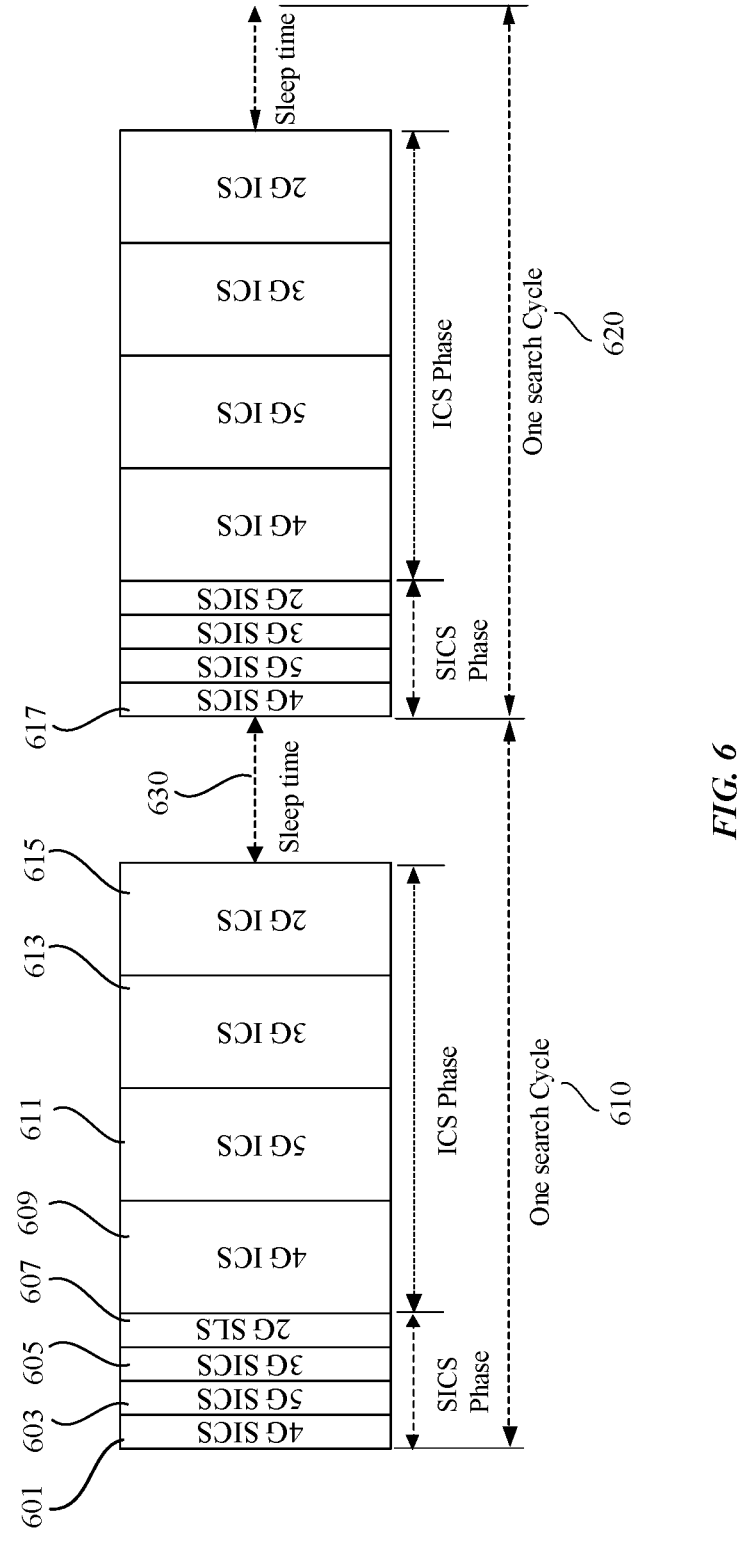
FIG. 6 illustrates an exemplary search cycle for a cell selection procedure without the ISICS feature, according to some aspects of this disclosure.

FIG. 6 illustrates an exemplary search cycle for a cell selection procedure without an intermediate stored information cell selection (ISICS) feature, according to some aspects of this disclosure. As a non-limiting example, each search cycle 610 and 620 includes a SICS phase and an ICS phase, followed by a sleep time 630 of a predefined duration. According to some aspects, the UE performs a search on a stored list of frequencies corresponding to the RATs it supports. As a non-limiting example, UE supports 5G, 4G, 3G, and 2G RATs. Based on a determination that a suitable cell is not identified during the SICS phase, the UE can initiate an ICS procedure. During the ICS procedure, the UE scans all frequencies of each RAT it supports.

At 601, the UE initiates the SICS phase and scans a stored list of frequencies corresponding to a 4G RAT. At 603, 605, and 607, the UE scans a stored list of frequencies corresponding to a 5G RAT, 3G RAT, and 2G RAT, respectively, where the SICS phase extends from 601 to 607. At 609, based on not finding a suitable RAT during the SICS phase, the UE initiates the ICS and scans all frequencies corresponding to a 4G RAT. At 611, 613, and 615, the UE scans all frequencies corresponding to a 5G RAT, 3G RAT, and 2G RAT, respectively. In this non-limiting example, the ICS phase extends from 609 to 615. According to some aspects, the UE can enter a sleep mode for a predefined amount of time at the end of the ICS phase. At 617, the UE exits from the sleep mode and initiates a SICS phase of another search cycle.

Figure 7:
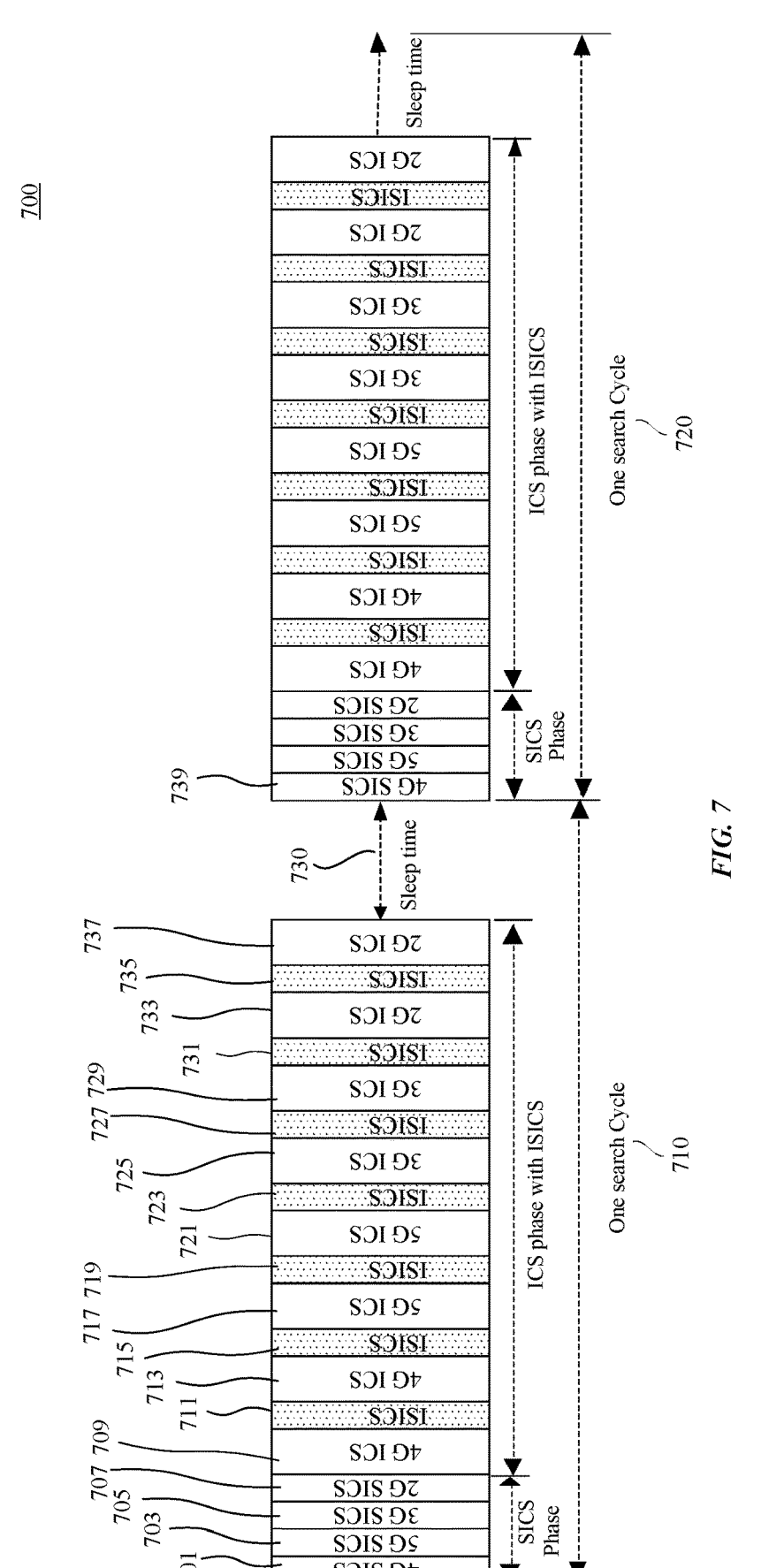
FIG. 7 illustrates an exemplary search cycle for a cell selection procedure with the ISICS feature, according to some aspects of this disclosure.

FIG. 7 illustrates an exemplary search cycle for a cell selection procedure with an ISICS feature, according to some aspects of this disclosure. According to some aspects, each search cycle 710 and 720 includes a SICS phase and an ICS phase followed by a sleep time 730 of a predefined duration. According to some aspects, the UE can perform a search on a stored list of frequencies corresponding to the RATs it supports. As a non-limiting example, UE supports 5G, 4G, 3G, and 2G RATs. Based on a determination that a suitable cell is not identified during the SICS phase, the UE initiates an initial cell search procedure and starts an ISICS timer. In the ICS phase, the UE can scan all frequencies of each RAT it supports. when the ISICS timer expires, the UE pauses the ongoing ICS procedure and performs an ISICS procedure. Based on a determination that a suitable cell is not found during the ISICS procedure, the UE can resume the paused ICS procedure and starts a second timer for the next ISICS procedure.

At 701, UE 103 initiates the SICS phase and scans a stored list of frequencies corresponding to a 4G RAT. At 703, 705, and 707, the UE scans a stored list of frequencies corresponding to a 5G RAT, 3G RAT, and 2G RAT, respectively. In this non-limiting example, the SICS phase extends from 701 to 707. Based on a determination that a suitable cell is not identified during the SICS phase, the UE initiates an ICS phase and starts an ISICS timer. At 709, the UE performs ICS by scanning a portion of frequencies corresponding to 4G RAT. At 711, in response to the expiration of the ISICS timer, the UE pauses the ICS scan of 4G frequency bands and performs an ISICS procedure. At 713, based on a determination that a suitable cell is not identified during the ISICS procedure, the UE resumes the ICS scan and starts a configurable timer for the next ISCIS procedure. At 715, in response to the expiration of the ISICS timer, the UE can pause the ICS scan and performs an ISICS procedure. At 717 and 721, the UE scans frequencies corresponding to a 5G RAT. At 725 and 729, the UE scans frequencies corresponding to a 3G RAT. At 733 and 737, the UE scans frequencies corresponding to a 2G RAT.

In this non-limiting example, the ICS phase extends from 709 to 737. Further, the ICS scan is optionally paused at regular intervals to perform the ISICS procedure at 711, 715, 719, 723, 727, 731, and 735. According to some aspects, if the UE fails to identify a suitable cell after completion of the ICS procedure, the UE can enter a sleep mode 730 for a predefined amount of time. At 739, the UE exits from the sleep mode and initiates SICS phase of search cycle 720. In this non-limiting example, the duration of the ISICS timer is less than the duration that UE 103 takes to complete scanning frequencies corresponding to the 5G RAT, 4G RAT, 3G RAT, or 2G RAT. The time it takes for the UE to scan frequencies corresponding to a RAT during the ICS procedure may vary from one RAT to another. Hence, the ISICS procedure may be performed more than once per search cycle on some RATs.

Figure 8:
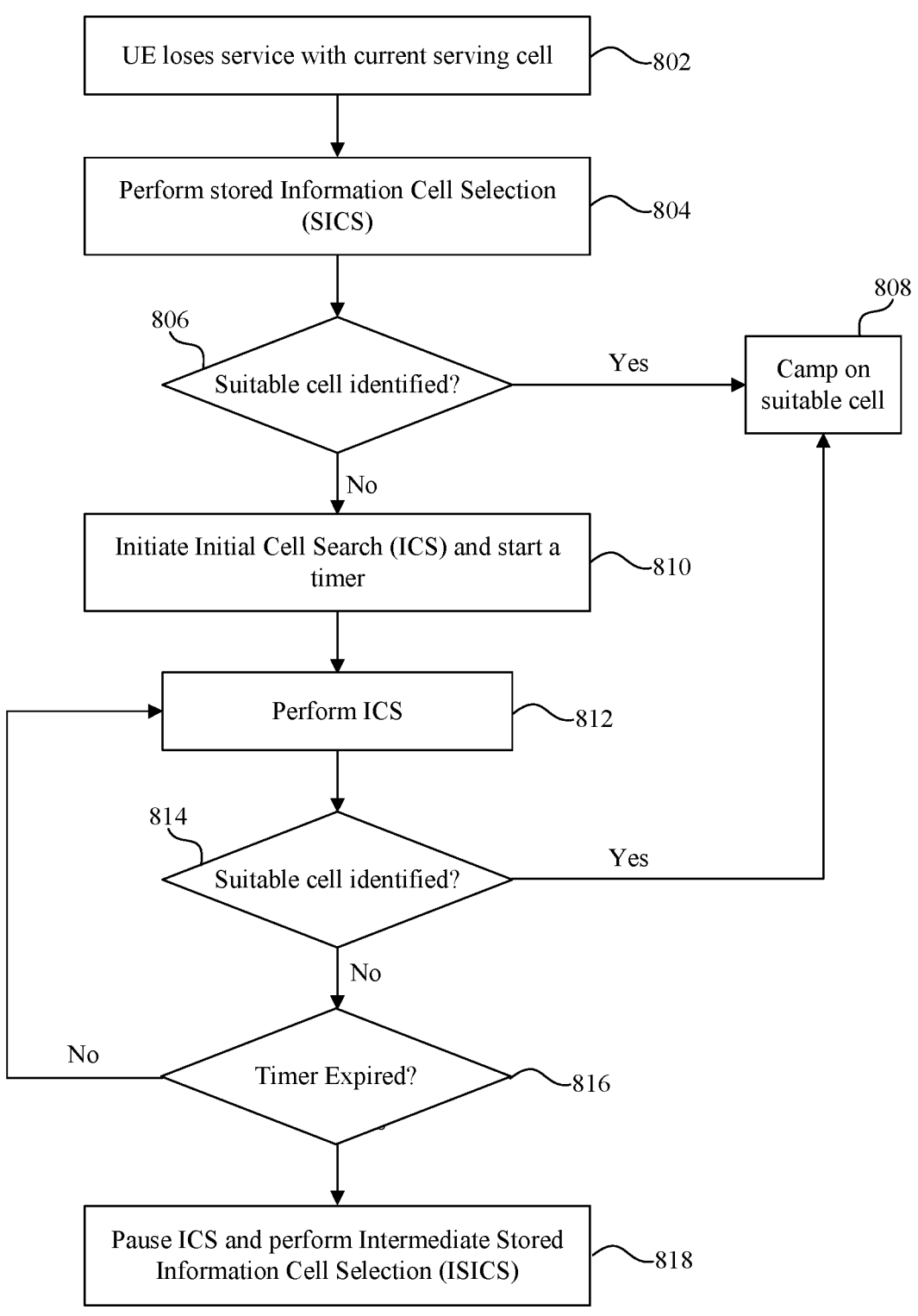
FIG. 8 illustrates an exemplary method for a system (for example, a UE) performing cell selection to get UE into service on prioritized RAT, according to some aspects of the disclosure.

FIG. 8 illustrates an example method 800 for a system (for example, a UE) performing cell selection to get UE into service on prioritized RAT after out-of-service detection, according to some aspects of the disclosure. As a convenience and not a limitation, FIG. 8 may be described with regard to elements of FIGS. 1-7. Method 800 may represent the operation of UE 103 of FIG. 1 implementing a cell selection procedure to get the UE into service on a prioritized RAT after an out-of-service detection. Method 800 may also be performed by system 200 of FIG. 2 and/or computer system 1000 of FIG. 10. But method 800 is not limited to the specific aspects depicted in those figures, and other systems may be used to perform the method as will be understood by those skilled in the art. It is to be appreciated that not all operations may be needed, and the operations may not be performed in the same order as shown in FIG. 8.

At 802, the UE detects a loss of service with a current serving cell. For example, the UE loses service from the current cell when the signal quality received by the UE falls below that required for cell suitability. According to some aspects, in response to detecting a loss of service, the UE initiates a cell selection procedure to identify and select a suitable cell on which to camp.

At 804, the non-access stratum (NAS) layer at UE performs a stored information cell selection (SICS) procedure to identify a suitable cell. However, the SICS procedure may be an optional step. For example, based on a determination that the UE has a loss of service from the current serving cell, the UE may directly proceed to initiate an ICS procedure without performing the SICS procedure. According to some aspects, the SICS procedure can comprise performing a search on a stored list of frequencies that are associated with one or more previously-used suitable cells. The SICS procedure can comprise performing a search on a stored list of frequencies, where the stored list of frequencies scanned by the UE during the SICS can correspond to a plurality of radio access technologies (RATs) supported by the UE. For example, the plurality of RATs supported by the UE can include new radio (NR), long-term evolution (LTE), universal mobile telecommunications system (UMTS), and global system for mobile communications (GSM).

At 806, the UE makes a determination of whether a suitable cell is identified during the SICS procedure. According to some aspects, a suitable cell fulfills a cell selection criteria, which can be fulfilled when the cell selection receive level and/or the quality level are above a given value: Srxlev>0 and Squal>0. According to some aspects, a suitable cell can either be a part of the selected PLMN, the registered PLMN, or PLMN of the equivalent PLMN list. According to some aspects, a suitable cell is not part of a tracking area that is in a list of forbidden tracking areas for roaming, and does not have a barred status. At 808, if a suitable cell is identified during the SICS procedure, the UE can camp on the cell.

At 810, if a suitable cell is not identified during the SICS procedure, the UE initiates an initial cell search (ICS) procedure and starts an intermediate stored information cell selection (ISICS) timer. According to some aspects, the NAS layer at the UE can initiate the ISICS timer. According to some aspects, the ISICS timer duration is configurable and can be set to be less than the time that UE may take to complete ICS. According to some aspects, the ISICS timer duration can be less than the time that the UE may take to complete scanning frequencies corresponding to and the NR band. According to some aspects, the ISICS timer duration can be less than the time that UE may take to complete scanning frequencies corresponding to a LTE or a UMTS band. According to some aspects, the ISICS timer duration can depend on the number of RATs supported by the UE.

At 812, the UE starts executing the ICS procedure. In the ICS phase, the UE can scan all frequencies of each RAT it supports. For example, during ICS, the UE can scan all frequencies corresponding to a 5G RAT, 4G RAT, 3G RAT, and 2G RAT. According to some aspects, UE can scan each carrier frequency to identify the strongest cell transmitting over that carrier frequency. At 814, the UE determines whether a suitable cell is identified during the ongoing ICS procedure. If the UE identifies a suitable cell during the ICS procedure, the UE can camp on the identified suitable cell.

At 816, the UE determines whether the ISICS timer has expired. If the UE has not identified a suitable cell and the ISICS timer has not expired, the UE continues performing the ICS procedure. However, if the UE has not identified a suitable cell and the ISICS timer has expired, the UE pauses the ICS procedure and performs an ISICS procedure.

At 818, in response to determining that the timer has expired, the UE pauses the ongoing ICS scan and performs an ISICS procedure to identify a suitable cell on a prioritized RAT. According to some aspects, during the intermediate SICS procedure, the UE can scan frequencies corresponding to a plurality of priority RATs. According to some aspects, the list of priority RATs can comprise the RAT corresponding to the last serving cell. According to some aspects, the list of priority RATs comprises the last registered RAT. According to some aspects, during the ISICS procedure, UE scans the RF frequencies corresponding to the priority RATs according to an order based on a predetermined priority. According to some aspects, an NR RAT can be a higher priority RAT than LTE. According to some aspects, LTE RAT can be a higher priority RAT than UMTS. According to some aspects, UMTS RAT can be a higher priority RAT than GSM. According to some aspects, the last registered RAT can be a higher priority RAT than LTE. According to some aspects, the last registered RAT can be a higher priority RAT than LTE.

Figure 9:
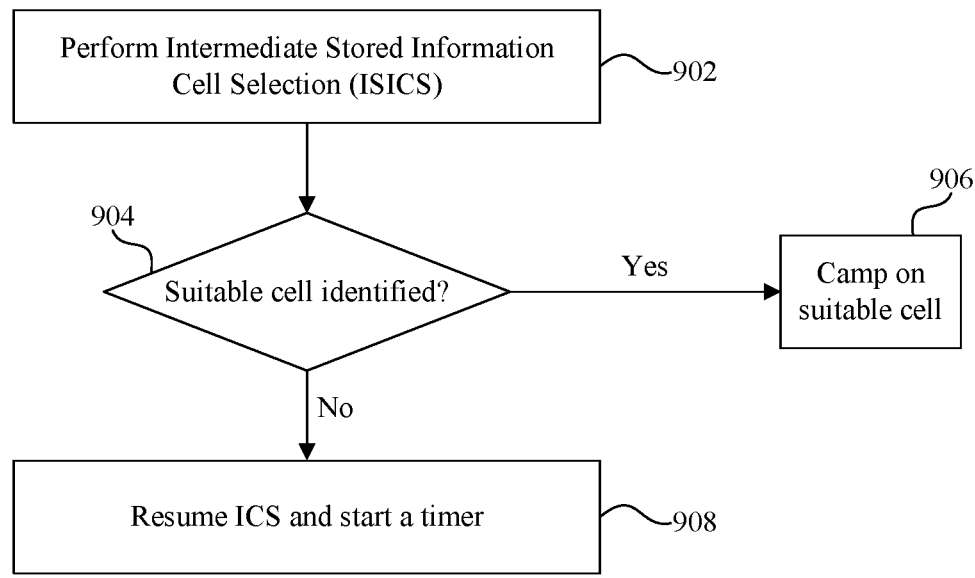
FIG. 9 illustrates an exemplary method for a system (for example, a UE) performing cell selection to get UE into service on prioritized RAT, according to some aspects of the disclosure.

FIG. 9 illustrates another example method 900 for a system (for example, a UE) performing cell selection to get UE into service on prioritized RAT after out-of-service detection, according to some aspects of the disclosure. As a convenience and not a limitation, FIG. 9 may be described with regard to elements of FIGS. 1-8. Method 900 may represent the operation of an electronic device (for example, UE 103 of FIG. 1) implementing a cell selection procedure to get the UE into service on the prioritized RAT after out-of-service detection. Method 900 may also be performed by system 200 of FIG. 2 and/or computer system 1000 of FIG. 10. But method 900 is not limited to the specific aspects depicted in those figures, and other systems may be used to perform the method as will be understood by those skilled in the art. It is to be appreciated that not all operations may be needed, and the operations may not be performed in the same order as shown in FIG. 9.

At 902, the UE performs an ISICS procedure to identify a suitable cell on a prioritized RAT. At 904, the UE determines whether a suitable cell is identified during the ISICS procedure. At 906, if the UE identifies a suitable cell during the ICS procedure, the UE can camp on the identified cell. At 908, if a suitable cell is not identified during the ISICS procedure, the UE can resume the paused ICS procedure and starts a timer for the next ISICS procedure.

Figure 10:
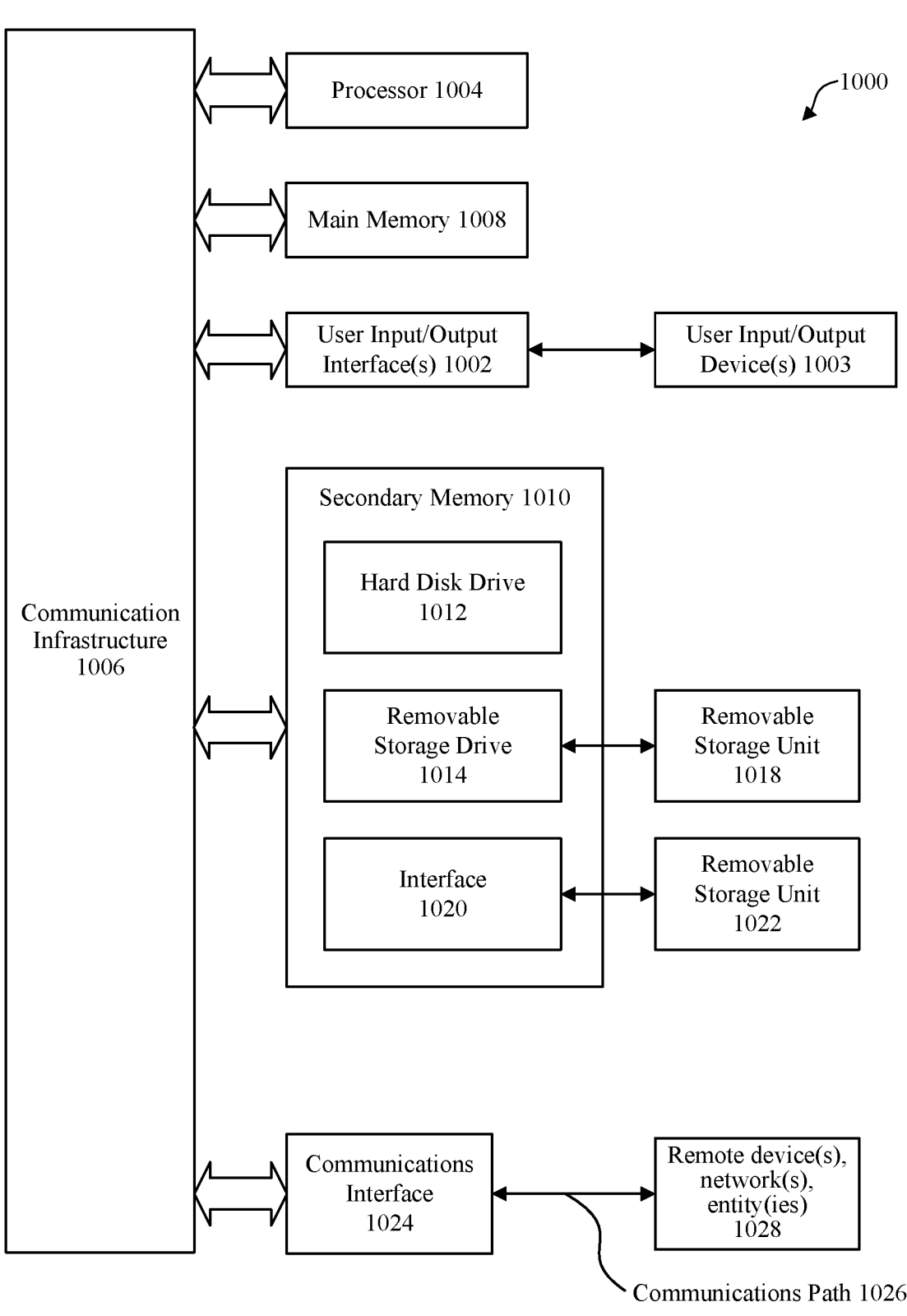
FIG. 10 is an example computer system for implementing some aspects or portion(s) thereof.

Various aspects can be implemented, for example, using one or more computer systems, such as computer system 1000 shown in FIG. 10. Computer system 1000 can be any well-known computer capable of performing the functions described herein such as devices 101, 103 of FIG. 1, and/or 200 of FIG. 2. Computer system 1000 includes one or more processors (also called central processing units, or CPUs), such as a processor 1004. Processor 1004 is connected to a communication infrastructure 1006 (e.g., a bus). Computer system 1000 also includes user input/output device(s) 1003, such as monitors, keyboards, pointing devices, etc., that communicate with communication infrastructure 1006 through user input/output interface(s) 1002. Computer system 1000 also includes a main or primary memory 1008, such as random access memory (RAM). Main memory 1008 may include one or more levels of cache. Main memory 1008 has stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to some aspects, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1000, main memory 1008, secondary memory 1010 and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 10. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "aspects" "an example," "examples," or similar phrases, indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE), comprising:
a transceiver configured to enable wireless communication with a current serving cell and one or more potential serving cells; and
a processor communicatively coupled to the transceiver and configured to:
determine whether the UE has a loss of service from the current serving cell;
in response to a determination that the UE has the loss of service from the current serving cell, initiate an initial cell selection (ICS) and start a timer, wherein the UE does not belong to a specific cell during the loss of service, wherein the ICS performs a search on a plurality of frequencies corresponding to a plurality of Radio Access Technologies (RATs);
determine whether a suitable cell is identified during the ICS and whether the timer has expired, wherein a duration of the timer is less than the time required to search all of the plurality of frequencies during the ICS; and
in response to a determination that a suitable cell is not identified during the ICS and the timer has expired, pause the ICS, and perform an intermediate stored information cell selection (ISICS) to identify a suitable cell, wherein ISICS performs a search, during the pause in the ICS, on a stored list of frequencies corresponding to a plurality of priority RATs that are a subset of the plurality of RATs.

2. The UE of claim 1, wherein the processer is further configured to:
determine whether a suitable cell is identified during the ISICS; and
in response to determining that a suitable cell is not identified during the ISCIS, resume the ICS and start a second timer.

3. The UE of claim 1, wherein the processor is further configured to:
perform a stored information cell selection (SICS), in response to a determination that the UE has the loss of service from the current serving cell, and determine whether a suitable cell is identified during the SICS; and
in response to a determination that a suitable cell is not identified during the SICS, initiate the initial cell selection (ICS) and start the timer.

4. The UE of claim 3, wherein the SICS comprises performing a search on a stored list of frequencies that are associated with one or more previously-used suitable cells.

5. The UE of claim 1, wherein the ISICS comprises performing a search on a plurality of frequencies corresponding to a last connected RAT corresponding to a last registered public land mobile network (PLMN).

6. The UE of claim 5, wherein a duration of the ISICS is less than a duration to perform the ICS.

7. The UE of claim 1, wherein the suitable cell is a cell that satisfies a cell selection criteria and is part of a selected PLMN, a registered PLMN, or a PLMN of an equivalent PLMN list.

8. A method performed by a user equipment (LE), comprising:

determining whether the UE has a loss of service;

in response to determining that the UE has a loss of service, initiating an initial cell selection (ICS) and starting a timer, wherein the UE does not belong to a specific cell during the loss of service, wherein the ICS performs a search on a plurality of frequencies corresponding to a plurality of Radio Access Technologies (RATs); and in response to determining that a suitable cell is not identified during the ICS and the timer has expired, pausing the ICS and performing an intermediate stored information cell selection (ISICS) to identify a suitable cell, wherein a duration of the timer is less than the time required to search all of the plurality of frequencies during the ICS, and wherein ISICS performs a search, during the pause in the ICS, on a stored list of frequencies corresponding to a plurality of priority RATs that are a subset of the plurality of RATs.

9. The method of claim 8, further comprises:

in response to determining that a suitable cell is not identified during the ISCIS, resuming the ICS and starting a timer.

10. The method of claim 8, further comprising:

in response to determining that the UE has a loss of service, performing a stored information cell selection (SICS).

11. The method of claim 10, wherein the SICS comprises performing a search on a stored list of frequencies that are associated with one or more previously-used suitable cells.

12. The method of claim 8, wherein the ISICS comprises performing a search on a plurality of frequencies corresponding to a last connected RAT corresponding to a last registered public land mobile network (PLMN).

13. A non-transitory computer-readable medium (CRM) storing instruction that when executed by a processor of a user equipment (UE) cause the processor to perform operations comprising:

in response to determining that the UE has a loss of service, initiating an initial cell selection (ICS) and starting a timer, wherein the UE does not belong to a specific cell during the loss of service, wherein the ICS performs a search on a plurality of frequencies corresponding to a plurality of Radio Access Technologies (RATs); and in response to determining that a suitable cell is not identified during the ICS and the timer has expired, pausing the ICS and performing an intermediate stored information cell selection (ISICS) to identify a suitable cell, wherein a duration of the timer is less than the time required to search all of the plurality of frequencies during the ICS, and wherein ISICS performs a search, during the pause in the ICS, on a stored list of frequencies corresponding to a plurality of priority RATs that are a subset of the plurality of RATs.

14. The non-transitory CRM of claim 13, wherein the ISICS comprises performing a search on a plurality of frequencies corresponding to a last connected RAT corresponding to a last registered public land mobile network (PLN).

* * * * *